United States Patent
Fang et al.

(10) Patent No.: US 12,316,787 B2
(45) Date of Patent: May 27, 2025

(54) DEVICE WITH MULTIPLE HARDWARE SIGNATURES FROM A SINGLE PUF CIRCUIT SOURCE AND RELATED METHODS AND APPLICATIONS

(71) Applicant: INTELLIGENT INFORMATION SECURITY TECHNOLOGY INC., Hsinchu (TW)

(72) Inventors: Wai-Chi Fang, Hsinchu (TW); Nicolas Jean Roger Fahier, Hsinchu (TW); Meng-Ting Wan, Hsinchu (TW); Kai-Yuan Guo, Hsinchu (TW); Bo-Ting Liu, Hsinchu (TW)

(73) Assignee: Intelligent Information Security Technology Inc., Hsinchu (TW)

( * ) Notice: Subject to any disclaimer, the term of this patent is extended or adjusted under 35 U.S.C. 154(b) by 413 days.

(21) Appl. No.: 18/076,523

(22) Filed: Dec. 7, 2022

(65) Prior Publication Data
US 2023/0208657 A1    Jun. 29, 2023

Related U.S. Application Data

(60) Provisional application No. 63/293,173, filed on Dec. 23, 2021.

(51) Int. Cl.
*H04L 9/32*    (2006.01)
*H04L 9/08*    (2006.01)

(52) U.S. Cl.
CPC .......... *H04L 9/3278* (2013.01); *H04L 9/0866* (2013.01); *H04L 9/0869* (2013.01); *H04L 9/3247* (2013.01)

(58) Field of Classification Search
CPC ... H04L 9/3278; H04L 9/0866; H04L 9/0869; H04L 9/3247; G06F 21/602
See application file for complete search history.

(56) References Cited

U.S. PATENT DOCUMENTS

| | | | |
|---|---|---|---|
| 10,891,366 B1 * | 1/2021 | Wu | H04L 9/0866 |
| 11,240,025 B2 * | 2/2022 | Wentz | G06F 21/602 |
| 2012/0137119 A1 * | 5/2012 | Doerr | G06F 21/575 |
| | | | 713/100 |
| 2019/0312734 A1 * | 10/2019 | Wentz | H04L 9/3239 |

(Continued)

FOREIGN PATENT DOCUMENTS

EP    3146670 B1 *    8/2021    ............... G09C 1/00

OTHER PUBLICATIONS

Yu et al.; On Designing PUF-Based TRNGs with Known Answer Tests ; IEEE Xplore; 6 pages (Year: 2018).*

*Primary Examiner* — Richard G Keehn

(57) ABSTRACT

An electronic device interfaced with a multiple digital signatures security engine, internally or externally, which enable the device to obtain PUF-based security credentials with the option to generate multiple unique digital signatures from the same source of PUF entropy. The multiple digital signatures security zone includes a source of PUF entropy dynamically measurable, a non-volatile memory storage media and a digital circuitry performing all the functions requested by the electronic device interfaced. The electronic device is able to select and switch between which unique digital signature to be involved for its related cybersecurity applications without depending on power-up sequences or single time operations after power-up sequence.

37 Claims, 8 Drawing Sheets

(56) References Cited

U.S. PATENT DOCUMENTS

| | | | |
|---|---|---|---|
| 2020/0351657 A1* | 11/2020 | Wentz | H04L 9/3247 |
| 2021/0051006 A1* | 2/2021 | Carlson | H04L 9/006 |
| 2022/0209966 A1* | 6/2022 | Chhabra | H04L 9/3278 |
| 2022/0209967 A1* | 6/2022 | Chhabra | H04L 9/3278 |
| 2023/0102178 A1* | 3/2023 | Chhabra | H04L 9/3278 |
| | | | 713/190 |
| 2023/0139712 A1* | 5/2023 | Fang | H04L 9/3278 |
| | | | 380/44 |
| 2024/0232863 A1* | 7/2024 | Wright | H04L 9/3278 |
| 2024/0333535 A1* | 10/2024 | Lindskog | H04L 9/3278 |

* cited by examiner

DEVICE WITH MULTIPLE HARDWARE SIGNATURES FROM A SINGLE PUF CIRCUIT SOURCE AND RELATED METHODS AND APPLICATIONS

CROSS REFERENCE TO RELATED APPLICATIONS

This application makes reference to, incorporates the same herein, and claims all benefits of a provisional application filed on Dec. 23, 2021 in the U.S. Patent Office and having Ser. No. 63/293,173.

BACKGROUND OF THE INVENTION

1. Field of the Invention

The present disclosure relates to a physical structure on a chip, especially to a physical unclonable function (PUF) embodied into a physical system.

2. Description of the Related Art

A physical unclonable function (PUF) is a function embodied into a physical system. A PUF source is in fact a true random patterns generating system, and its outcome shall be not reproducible given the same logic or structure. Common examples of PUF sources include human DNA or atmospheric noises. In electronics domain, PUF sources are designed using semiconductor technologies that find their uniqueness during the semiconductor manufacturing process experiencing random nanoscale variations. Hence, a common semiconductor design structure will result in individual digital patterns and behavior.

Based on this PUF source (also referred as entropy source), a system can run a PUF algorithm that is able to extract an unchanging digital sequence, referred as digital identity or hardware signature or digital signature.

The hardware signature, or digital signature, is the unique identity attached to a silicon chip, and combined with a true random number generator enables the implementation of root-of-trust system deployment, root-of-trust system described and enable by the Prior Art (PA) referenced.

In the given PA and related technology, authors make use of PUF source to generate or retrieve, with or without additional stored checkpoints data, also referred as helper data, a physically attached digital signature, further used to provision PUF derived keys for cryptography applications.

In the PA, the systems use a single hardware-based digital signature from a single source of PUF entropy. If one needs to update security credentials or unique digital sequences used in cryptographic systems, those are created and derivate from this single hardware-based digital signature, never shared or permanently stored. Root-of-trust hardware security systems deployment are designed to rely on a single hardware-based digital signature used to create necessary security credentials.

There are no disclosed PA systems proposing to ensure the plurality and diversity of cryptography credentials from a single PUF source system directly by being able to create multiple and independent, hence not derivate, hardware-based digital signatures within the same silicon chip.

The PA systems attach a single source of PUF entropy to a single hardware-based digital signature first, any other plural and security credentials are derivate from this hardware-based digital signature's base.

The principal defect of the PA resides in the fixed nature of the embodied digital signatures related to the cryptography keys provisioned. In other words, the PA can only attach a single source of PUF entropy to a single independent digital signature per device's operating time or power-up sequence.

Once a digital signature is compromised, or checkpoints data are compromised, there is no real-time changes, updates or recovery possible without shutting down and restarting all PUF-related process all over again, in some PA cases compromised digital signatures become simply a permanent security threat.

It is necessary to provide a PUF-based hardware digital signature capable of creating, updating and retrieving multiple digital signatures, furthermore each signature can be attached to their own PUF derived keys or PUF digital sequences, hence giving any electronic system the opportunity to carry multiple digital identities sets for various applications involving various system entities and stakeholders.

SUMMARY OF THE INVENTION

The present disclosure describes a circuit and system able to generate multiple unique digital signatures related to a single source of PUF entropy circuitry. Although the source of PUF entropy circuitry exhibits a single silicon unique pattern, the method and system implemented allows to create multiple device digital signatures created and recovered using true random numbers entangled with the unique quasi-static digital device print, also referred as PUF source, directly from within the hardware circuitry. While related patents and technology integrated methods and systems to successfully recover a similar unique digital pattern from a PUF source, this invention disclosure never uses directly this unique digital pattern but rather keep it as a base to recover randomly entangled multiple digital signatures beyond a simple Key Derivation Function procedure.

The technique used in this disclosure has similarities with some related prior art in terms of PUF systems structures, using a randomized PUF source with both static and dynamic entropy, a circuit to generate checkpoints data, a verification circuit to validate the digital identity recovery's success and the final digital signature recovery circuit using the checkpoints data. The disclosed methods to generate checkpoints data, verify the PUF integrity and recover each unique signature differ and allow the integration of another level of uniqueness by enabling the creation of multiple independent digital signatures entangled with: true random numbers, the designed Key Derivation Function, Format Preserving Encryption/Decryption, shuffling and toggling functions and logic-based digital circuitry. The root key of all signatures is hidden within different mathematical curves and is only used for the specifically targeted digital signature recovery process, every other security credentials created by the disclosed circuit being only related to each targeted digital signature, not directly related to the original quasi-static digital device print or PUF source. This is, in other words, a PUF system circuitry with a second level of randomized uniqueness able to effectively protect the host device while being dynamic, changeable and updatable. A successful attempt to compromise one digital signature does not compromise others, neither the original quasi-static digital device print.

The disclosed PUF system circuitry comprises a hardware implemented source of PUF entropy dynamically measurable and other logic and cryptography circuit blocks that can take various implementation forms, as silicon-based hardware circuitries but also as a processor firmware for some embodiments, and a non-volatile memory storage unit either part of the hardware physical PUF system or connected outside as a separate entity.

The present system disclosure can be deployed on any electronics system within or external to a microprocessor or processor or custom circuits as a PUF-based secure credentials provisioning element allowing to create a safe vault for any digital secrets but as well a storage-free secure credentials provisioning element that can rely on the volatile creation and recovery of multiple and unique true hardware identities so to source standard secure cryptography secrets with volatile unique circuits not involving any trace of storage of these secrets.

According to an aspect of the present application, a system comprising an electronic circuit to create a source of PUF entropy dynamically measurable that can be measured anytime during the device operation upon a trigger signal, and which result is used to generate a quasi-static digital device print and true random numbers, a random numbers generator circuitry using measured results from the source of PUF entropy dynamically measurable, a quasi-static states voting mechanism creating a quasi-static digital device print pattern using the measured results from the source of PUF entropy dynamically measurable, a set of digital bitwise shuffle and toggle functions to randomize and shuffle a quasi-static digital device print, a key derivation function engine taking random numbers, static and quasi-static digital sequences as inputs and generating an entangled digital output, a set of format preserving encryption and decryption engines which may be duplicated at will in the circuit including both encryption and decryption mechanisms, and providing the ability to create or enroll and recover and load multiple unique PUF-based digital sequences used as unique digital signatures, a non-volatile memory media to store certain checkpoints data but not limited to, which may be integrated within the device silicon area but not necessarily, a communication interface adapted to the system target host device to manage inputs and outputs of the disclosed system, a system controller to execute commands and provide the multiple digital signature security zone system results from the target host device or connected device. Further, the format preserving encryption and decryption engines take a digital key and a digital input data, encrypted data or plaintext data, sequence as inputs to output an encrypted or plaintext data, and is a symmetrical encryption mechanism.

In accordance with an embodiment of the present invention, the source of PUF entropy dynamically measurable is an array of PUF cell units that can be measured after electrical challenge at any given time, independently from power cycle, system clock frequencies and manufacturing process.

In accordance with an embodiment of the present invention, the random numbers generator circuit is a true random numbers generator using repeated measurements of source of PUF entropy dynamically measurable binary states results to generate directly a true random number without assistance of further pseudo-random generation algorithms.

In accordance with an embodiment of the present invention, the quasi-static states voting mechanism is a statistic counting circuit using the repeated measurements of source of PUF entropy binary states measured results to generate a quasi-static digital device print which may or may not be different for each measurement iteration cycle.

In accordance with an embodiment of the present invention, the shuffle and toggle functions use internally-created true random numbers from the source of PUF entropy dynamically measurable and may be implemented as shared resource block for any functions, wherein the functions may use defined static parameters that can be changed without affecting the correct functioning of the system. Further, the shuffle and toggle functions can be either a hardware circuitry or a software implementation.

In accordance with an embodiment of the present invention, the key derivation function is a circuit composed of a defined controlled loop of checksum functions and hash functions with defined internal digital parameters.

In accordance with an embodiment of the present invention, besides the source of PUF entropy, the design of the rest of the system can be either a hardware circuitry implementation or a software implementation.

In accordance with an embodiment of the present invention, the non-volatile memory unit can be internally or externally integrated to the system.

In accordance with an embodiment of the present invention, wherein the communication interface is integrated with the central system controller according to the host target device, independently from an external interface.

According to another aspect of the present invention, a digital signature index enrollment system comprising a true random numbers generator used to randomize each enrollment and iteration process in order to create a different digital signature for each iteration independently from other fixed digital inputs, a source of PUF entropy dynamically measurable used to measure a unique system digital behavior, digital device print, after any given requests during device operation; a logic circuitry comprising a set of sequentially arranged key derivation functions, scrambling functions, shuffle functions, toggle functions, checksums functions and format preserving encryption and decryption functions to generate a ciphered unique digital signature and checkpoints data to recover the ciphered unique digital signature without performing error-correcting codes algorithms but using multiple curves cryptography engine based on fixed inputs, source of PUF entropy and checkpoints data to converge toward a unique digital signature, a non-volatile storage media to save each different digital signatures mathematical checkpoints data used to recover and load a target indexed digital signature.

In accordance with an embodiment of the present invention, the true random numbers generator is logic bitwise operations based using the output of the source of PUF entropy dynamically measurable results as input.

In accordance with an embodiment of the present invention, the logic circuitry made to do a digital signature enrollment uses as inputs the true random numbers generator, source of PUF entropy dynamically measurable results that may be as multiple as desired and optional digital host device inputs.

In accordance with an embodiment of the present invention, the non-volatile storage media stores the specific mathematical checkpoints data attached to a unique set of random numbers, a unique set of source of PUF entropy and unique optional digital inputs that may be fixed internally to the system when not specified.

In accordance with an embodiment of the present invention, the digital checkpoints data are stored in non-volatile memory media and are used to recover and load one unique and indexed digital signature; and where the non-volatile memory media may store one or several versions of checkpoints data to generate several unique digital signatures enabling the multiplicity of digital signatures on a single system.

In accordance with an embodiment of the present invention, the checkpoints data saved in non-volatile memory media are saved and indexed according to a specific index given by the host or connected device through the communication interface.

In accordance with an embodiment of the present invention, the checkpoints data are singularly attached to the intrinsic system of the device as well as defined digital inputs, there are a series of random numbers that do not present any relevant clues regarding the values of each digital signatures or used digital inputs.

According to another aspect of the present invention, a PUF digital signature recovery apparatus is provided. It is to be noted that the apparatus, alternatively addressed as "mechanism". The PUF digital signature recovery apparatus comprising a source of PUF entropy dynamically measurable, a logic circuitry comprising a set of sequentially arranged key derivation functions, toggling functions, checksums functions and format preserving encryption end decryption functions to retrieve a ciphered unique digital signature using checkpoints data and multiple curves cryptographic functions based on fixed inputs, entropy source and the checkpoints data to converge toward the ciphered unique signature, similar system functions block, a non-volatile storage medium to read digital signatures mathematical checkpoints data.

In accordance with an embodiment of the present invention, the source of PUF entropy dynamically measurable provides a unique measured result each time requested.

In accordance with an embodiment of the present invention, the logic circuitry performs the digital signature recovery and load based on target indexed checkpoints data from the non-volatile memory storage media, new PUF source results measurements and optional host or connected device digital inputs that may also be fixed as parameters or as default values.

In accordance with an embodiment of the present invention, the non-volatile memory check point data are targeted by the host device through the communication interface system and constitute the selected digital signature index to recover and load.

In accordance with an embodiment of the present invention, the system recovers a unique digital signature according to the host device digital inputs.

According to another aspect of the present invention, a format preserving encryption and decryption engines are provided. The format preserving encryption and decryption engines comprising a set of shuffle and toggle functions taking an input key, or input signature, and an input plaintext data, or input encrypted data, to performs changes on input plaintext data or input encrypted data according to the input key or input signature, a xor-based operations engine using a bitwise input permutation table to permute the output of the shuffle and toggle function block, a checksum function that will create a hash value of the output of its previous function output, a controlled loop with defined number of iteration that will determine when the final output of the format preserving encryption or decryption algorithm is ready taking the last shuffle and toggle function result as final output.

In accordance with an embodiment of the present invention, the digital input signature is used as symmetrical encryption key and where the host device through the communication provides the data to encrypt or decrypt and receives the related result.

In accordance with an embodiment of the present invention, the digital input key is used as symmetrical encryption key and where the host device provides the data to encrypt or decrypt and save the result in non-volatile memory media.

In accordance with an embodiment of the present invention, the format preserving encryption engine performs data input encryption.

In accordance with an embodiment of the present invention, the format preserving decryption engine performs data input decryption.

In accordance with an embodiment of the present invention, the digital signature is used as symmetrical encryption key and where the host device requests the data encryption or decryption from input loaded from the non-volatile memory media.

In accordance with an embodiment of the present invention, the system is able to create multiple version of unique digital checkpoints data at any time of the device operations cycles.

In accordance with an embodiment of the present invention, the random number generator can be requested at any time of the device cycle.

In accordance with an embodiment of the present invention, the digital signature recovered may be stored within the device volatile memory for a system-defined or user-defined time or cycles.

In accordance with an embodiment of the present invention, the communication interface and central system controller may be a processor unit.

In accordance with an embodiment of the present invention, the management of the creation and recovery of digital signatures depend on host device commands or pre-defined commands operations without affecting any other device and host device operations cycles, powering up and functions.

In accordance with an embodiment of the present invention, the device outputs seen by the host device is only either the output of the true random number generator unit or the output for the format preserving encryption and decryption.

According to another aspect of the present invention, a dynamic and re-usable PUF-based multiple unique digital hardware signatures creation and recovery system comprising source of PUF entropy dynamically measurable at any time during the device operation that is used to create or enroll and recover every different indexed hardware-based digital signatures, a true random numbers generator engine, source of PUF entropy dynamically measurable data, a permanent and dynamic digital access engine to different indexed set of external or internally saved checkpoints data, each set of checkpoints data is related to one particular hardware signature index, generated during signature enrollment mechanism and used for signature recovery and loading mechanism, a hardware digital signatures enrollment mechanism, in charge of creating an indexed hardware digital signature's checkpoints data based on fixed and dynamic parameters;

a hardware digital signatures enrollment mechanism, in charge of creating a hardware-based digital indexed checkpoints data related to a unique digital signatures, a hardware digital signatures recovery mechanism, in charge of recovering an indexed hardware-based digital signature using the indexed checkpoints data and re-using the same fixed and/or dynamic parameters used for the digital signatures enrollment mechanism.

In accordance with an embodiment of the present invention, the source of PUF entropy dynamically measurable can only be implemented in hardware design while the other elements can be either implemented by software or hardware.

In accordance with an embodiment of the present invention, the permanent and dynamic digital access engine to internally or externally saved checkpoints data is a logic design of a real-time read and write protocol that may be called or used at any given time of the device operation cycles.

In accordance with an embodiment of the present invention, the enrollment engine of the hardware digital signature creates unique checkpoints data to ensure the success of the recovery and load mechanism and is based on the use of a set of cryptography functions.

In accordance with an embodiment of the present invention, the recovery mechanism of the hardware signature reads the unique checkpoints data for the target hardware signature index and recover this unique digital signature using the same set of, or at least one, cryptography functions.

BRIEF DESCRIPTION OF THE DRAWINGS

The accompanying Figures (Figs.) illustrate embodiments and serve to explain principles of the disclosed embodiments. It is to be understood, however, that these Figures are presented for purposes of illustration only, and not for defining limits of relevant applications. It is to be noted, however, that the appended drawings illustrate only typical embodiments of this application and are therefore not to be considered limiting of its scope, for the application may admit to other equally effective embodiments.

These and other features, benefits, and advantages of the present application will become apparent by reference to the following text Figure, with like reference numbers referring to like structures across the views, wherein.

DESCRIPTION OF THE PREFERRED EMBODIMENTS

Figure 1:
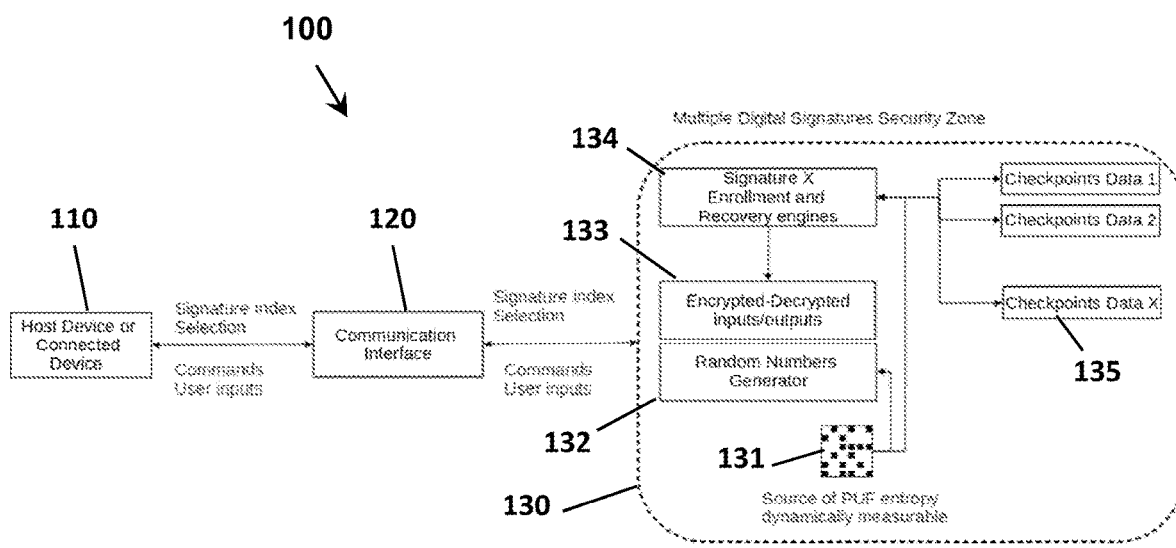
FIG. 1 describes an electronic device, referred as host device or connected device in certain embodiments, interfaced with an electronic circuit providing multiple digital signatures-based security credentials, referred as Multiple Digital Signatures Security Zone, for cybersecurity applications through a communication interface.

The present application is described hereinafter by various embodiments with reference to the accompanying drawing, wherein reference numerals used in the accompanying drawing correspond to the like elements throughout the description.

While the present application is described herein by way of example using embodiments and illustrative drawings, those skilled in the art will recognize that the application is not limited to the embodiments of drawing or drawings described and are not intended to represent the scale of the various components. Further, some components that may form a part of the application may not be illustrated in certain Figures, for ease of illustration, and such omissions do not limit the embodiments outlined in any way. It should be understood that the drawings and detailed description thereto are not intended to limit the application to the particular form disclosed, but on the contrary, the application is to cover all modifications, equivalents, and alternatives falling within the scope of the present application as defined by the appended claim. As used throughout this description, the word "may" is used in a permissive sense (i.e. meaning having the potential to), rather than the mandatory sense, (i.e., meaning must). Further, the words "a" or "an" mean "at least one" and the word "plurality" means "one or more" unless otherwise mentioned. Furthermore, the terminology and phraseology used herein is solely used for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited, and is not intended to exclude other additives, components, integers or steps. Likewise, the term "comprising" is considered synonymous with the terms "including" or "containing" for applicable legal purposes.

The upcoming challenges regarding the security of individual electronics devices leads toward systematic inclusion of a Physically Unclonable Function (PUF) system that will serve as a base comparable to a unique silicon DNA circuit, to establish trusted connections between devices, to establish device's attached singular encryption and decryption rules, unique set of cryptographic keys and unique recognizable digital signature for various connected services.

The main challenge for modern electronic devices is therefore to include within itself a circuit or system that will be generally manufactured but that will permit to obtain unique digital responses to specific digital challenges, which is the purpose of PUF systems and their circuitry. Hence an identical system design with identical manufacturing rules and processes still ensure recoverable and measurable digital uniqueness to be used as the root identity for devices' secure digital transactions and applications.

A PUF system systematically includes a source of PUF entropy circuitry combined with PUF engine to create and recover unique digital sequences. In some popular PUF system techniques, typically using SRAM-based logic for the source of PUF entropy but not limited to, the PUF engine makes use of so-called Checkpoints data, also referred as helper data in some prior art, that will be used to retrieve the unique digital PUF sequences entangled with digital secrets coming from the randomness of the source of PUF entropy. In other PUF system techniques, the use of checkpoints data is not necessary and digital unique sequence are directly recovered from processing the measured source of PUF entropy circuitry responses. However, although not having any records of entangled checkpoints data with the source of PUF entropy, these PUF methods do not offer any flexibility in changing, updating or entangling the unique digital PUF sequences responses with anything but the original source of PUF entropy circuitry, which may be an issue if it appears compromised by any means.

Traditional PUF systems using Checkpoints data, also called Helper Data, include Error-Correcting Codes circuitries to ensure a successful recovery of unique digital sequence from a source of PUF entropy that is always showing variations across different measurements. The presented disclosure, although using checkpoints data as well does not rely on error correcting codes but on curve cryptography algorithms with a combination of key derivation functions and format preserving digital encryption and decryption, along with digital shuffling and logic-based operations. Using curve cryptography PUF engines allows more tolerances regarding the bit error-rates, intra-hamming and inter-hamming distances on the measurements of the source of PUF entropy, simply because the implemented curve cryptography is able to balance the distribution of digital states and to tolerate bits' variations without having to perfectly correct these errors or variations.

Some pitfalls of using error-correcting codes for unique digital sequence recovery include first the fact that the amount of required computation depends on the number of detected errors which is likely to increase over time, and second that the system is in some cases unable to know if the recovered digital signature is actually correct or not which can in few cases leads to false positive results and undetectable errors.

Using multiple curves cryptography algorithms permits the PUF system to recover unique digital sequences without having to correct perfectly all the errors from the measurements of the source of PUF entropy. It statistically approaches a unique solution by convergence of multiple mathematical curves, which allows a larger mar-gin to recover a correct unique digital signature considering the inevitable changes within the source of PUF entropy over time. Moreover, this more complex converging try-and-error type of converging curves mechanism allows the system to check for the validity of the obtained results hence leading to a number of false positive results quasi-null over time. Instead, these seldom digital signature recoveries false positive results in the prior art are replaced by true negative results without risking to affect the level of security provided to the host device.

Moreover, the present disclosure integrates a PUF engine that is further able to entangle a single unique digital pattern from the original source of PUF entropy with randomized curve cryptographic mathematical solutions, which is the equivalent of having a second level of digital uniqueness to enable the creation and retrieval, also referred as recovery in certain embodiments, of unlimited digital unique signatures all related to the same source of PUF entropy circuitry, entangled with recoverable truly randomized checkpoints data codes.

In other words, the present system disclosure potential outputs can be compared to the duplication of all related PA of PUF system technologies within a single silicon device, with the ability to keep a single source of PUF entropy source and a single integrated system circuitry with PUF engines.

In certain embodiments, the letter X refers to one of the multiple digital signatures that the disclosed system can produce and recover.

The invention disclosed, as shown in 100 of FIG. 1, is composed by a host device or connected device 110 that can be any computer system or computational processor equipped with a communication interface 120, either standard such as Universal Asynchronous Receiver-Transmitter (UART), Serial Peripheral Interface (SPI), Inter-Integrated Circuit (I2C), Advanced extensible Interface (AXI), but not limited to, and a multiple digital signatures security zone 130, also referred as secure zone, circuitry performing all PUF-related functions requested by the host device or connected device 110 through the communication interface 120. The secure zone circuitry 130 in FIG. 1 is referred as multiple digital signatures security zone and is externally connected or internally connected to the target host electronic device. The external electronic device may select which unique digital signature index X to perform the operations of the signature X enrollment and recovery engines 134 with and is able to send and receive specific digital sequences to the multiple digital signatures secure zone 130. The device may or may not use specific input digital sequences to further entangle each digital signature index X with a digital input referred in certain embodiment as token. Without a specified input token from the host device 110, the disclosed system may use a default token value that has no impact regarding the enabled multiplicity of digital signatures and the randomness of each digital signature index X. Each digital signature is entangled to its specific randomized checkpoints data set 135 using a random numbers generator 132, the optional user's input token and a common source of PUF entropy dynamically measurable 131. Therefore, the enabled duplicity of independent hardware-based digital signatures within a single device using a single source of PUF entropy is created from being able to trigger this source of PUF entropy source dynamically at any time and select any particular check-points data set at any time. Additional hardware signatures entanglement may be obtained by specific fixed parameters and/or user inputs, referred as token. The outputs of the invention disclosed as seen by the host or connected device 110 are the outputs of either the true random numbers generator 132 or the encrypted/decrypted inputs/outputs sub-system 133.

Figure 2A:
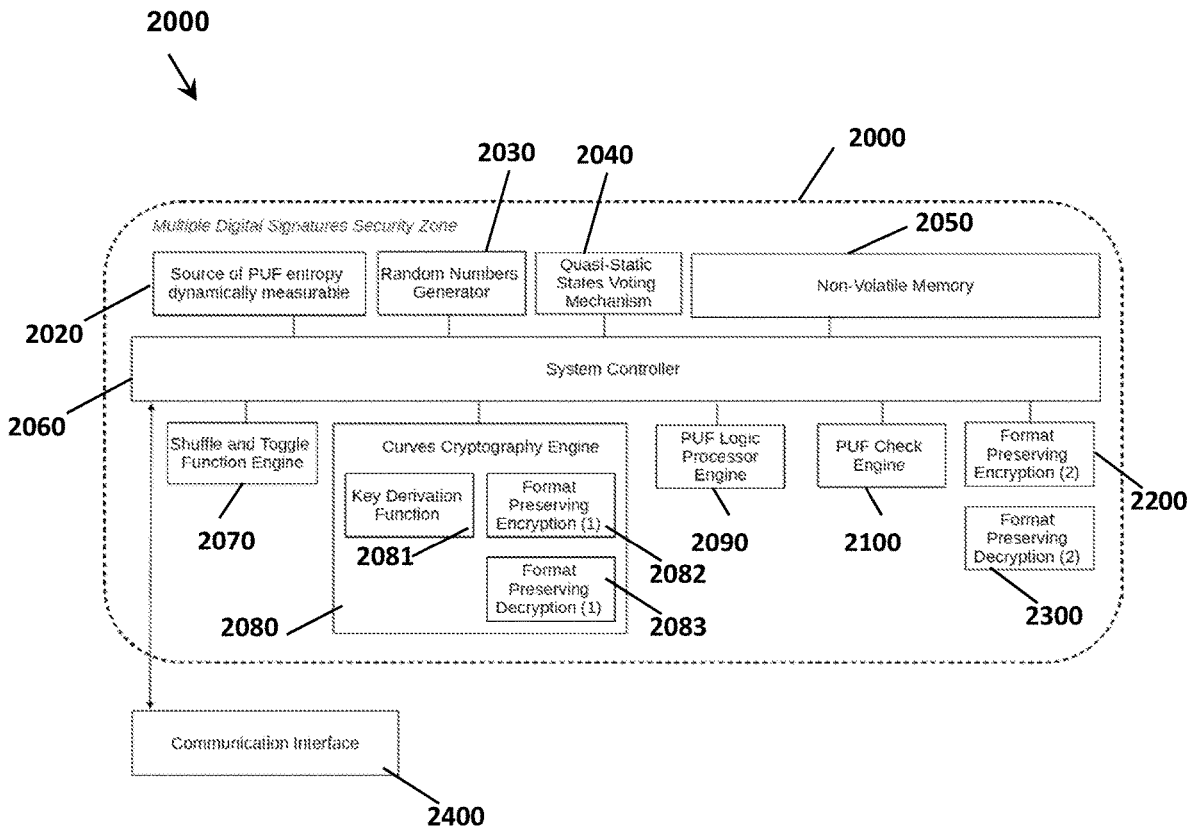
FIG. 2A shows an embodiment of the Multiple Digital Signatures Security Zone circuitry used in FIG. 1.
Figure 2B:
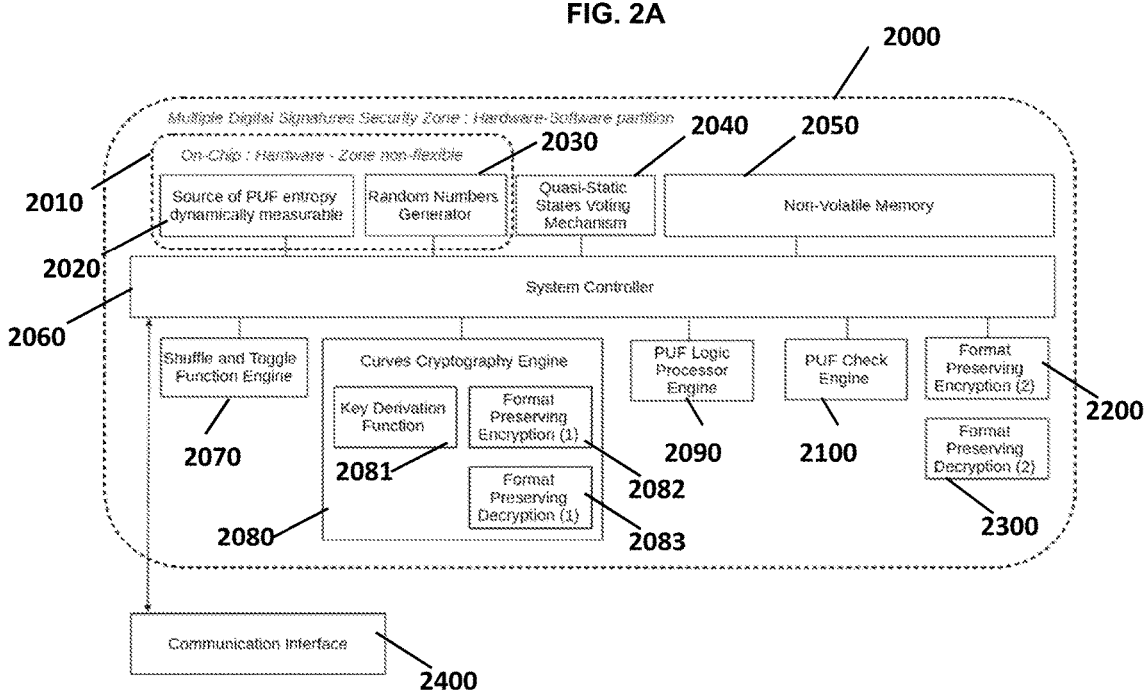
FIG. 2B shows an embodiment of the Multiple Digital Signatures Security Zone circuitry used in FIG. 1 where the design of the source of PUF entropy has to be integrated physically in hardware and where the rest of the circuitry can be integrated in various forms including software and/or physical hardware.

The multiple digital signatures security zone 2000 is described in FIG. 2A and FIG. 2B and interfaced with other system via the communication interface 2400. It is composed of a source of PUF entropy dynamically measurable 2020, a random numbers generator 2030, a quasi-static states voting mechanism 2040, a non-volatile memory media 2050, a system controller 2060 for operation management and communication interface management, a binary shuffle and toggle function engine, a curves cryptography engine 2080 including one or more Key Derivation Function (KDF) 2081 and Format Preserving Encryption (FPE) 2082 and Decryption (FPD) 2083, a set of logic-based operations functions with the PUF logic Processor Engine 2090, a PUF check engine 2100 system reusing the functions within the curves cryptography engine 2080 and an optional second version FPE and FPD engines 2200 and 2300 that can be used for independent sequences encryption and decryption with the recovered digital signature index X by the rest of the PUF system. This extra FPE-FPD symmetrical encryption system composed by 2200 and 2300 may include further standard cryptography algorithms, such as AES.

As shown in FIG. 2B, the source of PUF entropy dynamically measurable 2020 and random numbers generator 2030 are bound to be integrated only by hardware designs means in an on-chip hardware zone non-flexible 2010 by design while all the other functions and system blocks of the present disclosure 2400, 2050, 2060, 2070, 2080, 2090, 2100, 2200, 2300 and 2400 may be either implemented by software means or hardware means.

Each system block attached to the system controller 2060 is further described with its own embodiments, the role and integration of the system controller 2060 being the control and interconnection of each of these system blocks after receiving related commands requests from the host device or connected device 110.

Figure 3:
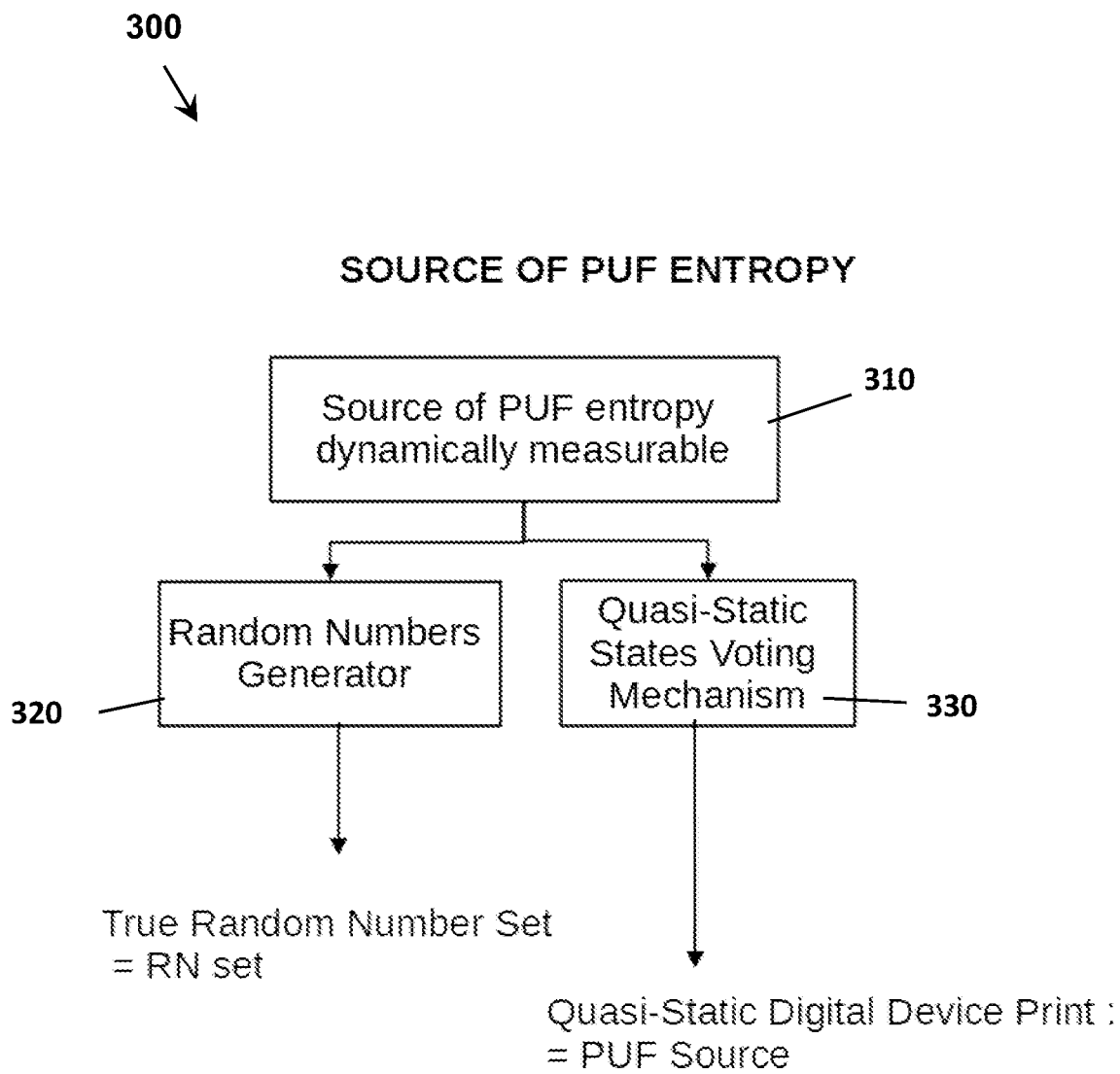
FIG. 3 show the description of the source of PUF entropy sub-system that can deliver on-demand with trigger signal both true random numbers and a quasi-static digital device print unique to each silicon device entity manufactured.

The source of PUF entropy 300 is based on a source of PUF entropy dynamically measurable 310, FIG. 3, which is a circuitry that can be measured and accessed at any time of the device and circuits operations, not dependent of other electronic processes than a digital triggered signal measurement circuit, for instance not dependent of power cycles or specific electronics voltages biasing or impedance biasing.

The dynamically measured results of the source of PUF entropy are used by two different processes: a true random numbers generator 320 and a quasi-static states voting mechanism 330.

The true random numbers generator 320 can be used independently upon the host device requests to obtain a true random number directly for any function, mechanism or engine of the invention disclosed. The quasi-static states voting mechanism 330 is used during of a digital signature index X enrollment 600 mechanism or during a digital signature index X recovery and load 700 mechanism.

In FIG. 3, the random numbers generator 320 output a true random numbers set, also referred as RN set, or RN set X in certain embodiment to indicate the current digital signature index being created. During the generation or creation of a signature index X referred as signature index X enrollment 600, a certain set of random numbers called RN set X will be used to entangle the specific signature index X with its randomized checkpoints data 135 for digital signature index X enrollment and recovery engines 134, described respectively in FIG. 6 for enrollment 600 and FIG. 7 for recovery and load 700. The source of signature multiplicity comes from the ability to generate different random numbers sets, RN set X, at any given time which will entangle every newly created digital signature X with a different random numbers set, RN set.

While the device is not used or operated, the checkpoints data for index X 135 have the same significance as a list of true random numbers that only find their use and logic when algorithmically combined with all the user inputs, token, and fixed parameters entanglements as well as the varying results of the measured of the source of PUF entropy 300.

In further descriptions of the multiple digital signatures security zone 2000 certain embodiments, the result of random numbers generator engine is referred as RN set and the output of the quasi-static states voting mechanism 330 is referred as PUF source. Both results are used for creating a new digital signature index X and the PUF source alone is used to recover the previously created digital signature X using checkpoints data for index X 135 and the integrated curves cryptography engine 2080 algorithms capable of recovering un-randomized digital signatures, or root identities, from randomized stored checkpoints data index X 135 and every time changing source of PUF entropy 131 measurement results, even if there are a certain amount of bits variations across different measurements that do not need to be perfectly corrected.

Figure 4:
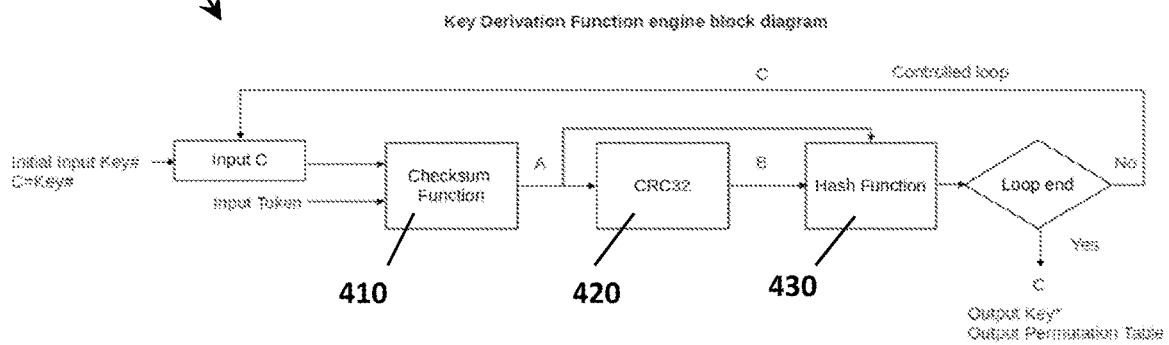
FIG. 4 describes the method and flow to implement the circuitry of Key Derivation Function (KDF) used in the systems described in FIG. 2A and FIG. 2B.

The KDF engine block diagram or mechanism 400 is described in FIG. 4, part of the curves cryptography engine 2080 in FIG. 2A and FIG. 2B. The KDF 400 consist in a designed controlled loop of successive checksum function 410, cycle redundancy check size 32 bits (CRC32) 420 and a hash function 430. The KDF 400 takes two digital inputs: an initial input Key referred as Key# and an input token. The input token can be fixed by a default value if the host device does not specify it through the communication interface.

The input Key# is successively updated and re-input as the digital sequence referred as C being the output result of the Hash function 430. The input C is combined with the fixed input token, processed by CRC32 420 for a part of it or all of it, then both checksum function 410 and CRC32 420 results are used in the Hash function 430 to produce the updated C values. Once the KDF 400 controlled loop is completed, the KDF results is corresponding to the last C result which is referred as an output Key*, different from the initial input Key#, and a bit-wise permutation indexed table referred as Output Permutation Table, result of accumulated permutations throughout the controlled loop.

The KDF 400 described in the FIG. 4 embodiment may be used several times during any of the disclosed invention processes including the signature index X enrollment 600, signature index X recovery and load mechanism 700, or within the logic of the second FPE (2) 2200 and FPD (2) 2300 in FIG. 2A and FIG. 2B.

During certain algorithmic embodiments described, the KDF mechanism 400 is followed by 510 or 530 Format Preserving Encryption and 520 or 540 Decryption engines described in FIG. 5A 510, FIG. 5B 520, FIG. 5C 520 and FIG. 5D 540. FPE and FPD implement a symmetrical encryption-decryption algorithm, similar to AES, which means given the same key and initial vectors the input and output of FPE, 510 or 530, respectively correspond the output and input of FPD, 520 or 540.

Figure 5A:
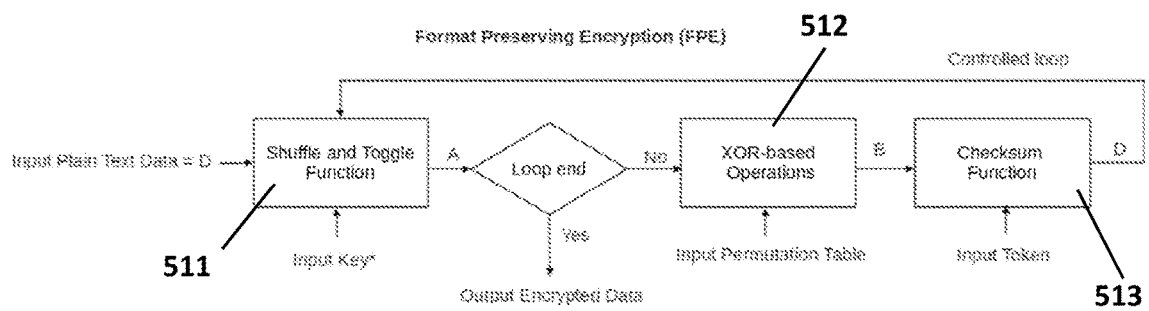
FIG. 5A describes the method and flow to implement the circuitry of Format Preserving Encryption (FPE) used in the systems described in FIG. 2A and FIG. 2B, as the Format Preserving Encryption (1) block, symmetrical cryptographic mechanism with the system of FIG. 5B.
Figure 5B:
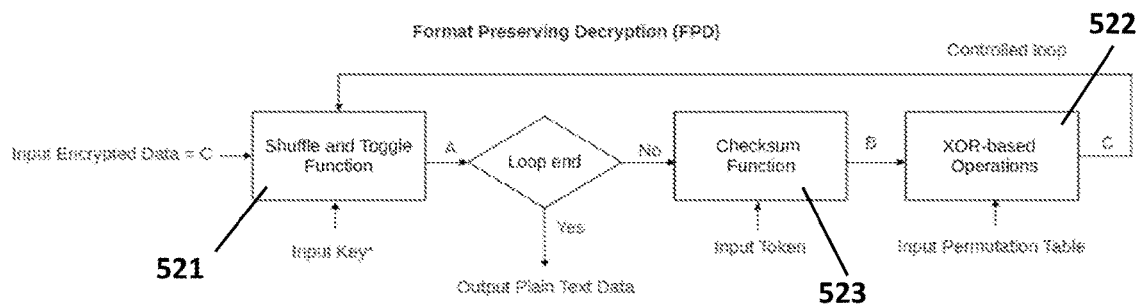
FIG. 5B describes the method and flow to implement the circuitry of Format Preserving Decryption (FPD) used in the systems described in FIG. 2A and FIG. 2B, Format Preserving Decryption (1) block, symmetrical cryptographic mechanism with the system of FIG. 5A.
Figure 5C:
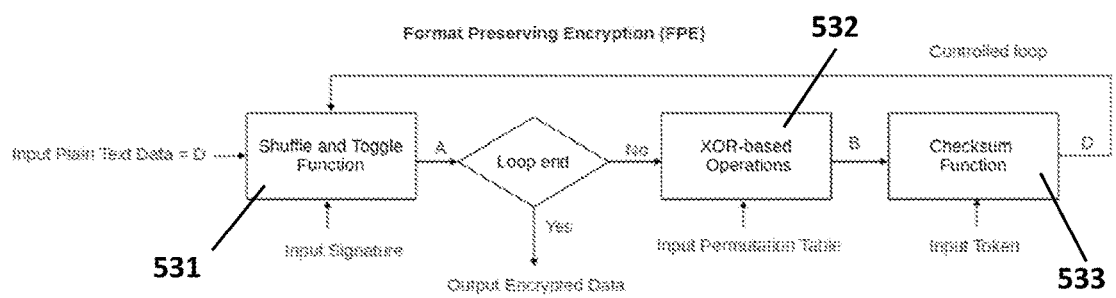
FIG. 5C describes the method and flow to implement the circuitry of Format Preserving Encryption (FPE) used in the multiple digital signatures security zone entity described in FIG. 2A and FIG. 2B, as the FPE (2) function, which output and input sequence come and go through the host device communication interface and whose results depend on the recovered signature X after the process described in FIG. 7.
Figure 5D:
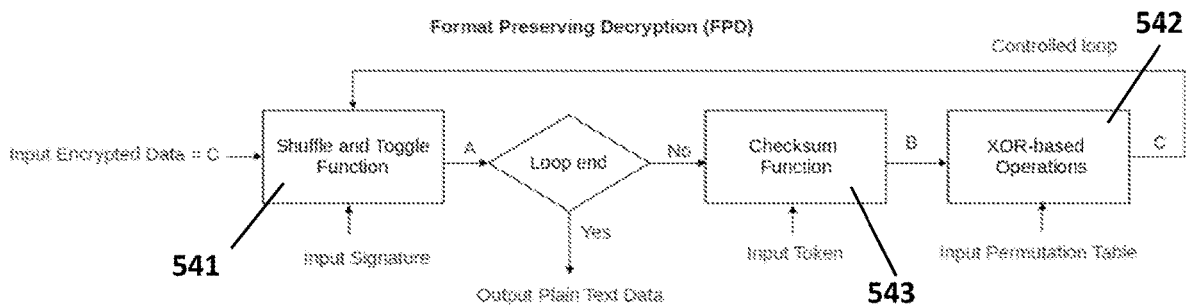
FIG. 5D describes the method and flow to implement the circuitry of Format Preserving Decryption (FPD) used in the multiple digital signatures security zone entity described in FIG. 2A and FIG. 2B, as the FPD (2) function, the decryption operation of the FIG. 5C, which output and input sequence come and go through the host device communication interface and whose results depend on the recovered signature index X after the process described in FIG. 7.

The FPE 510 and FPE 530-2200 functional block diagrams in FIG. 5A and FIG. 5C respectively, are composed of a shuffle and toggle function 511 and 531 using random numbers from RN set of 320 as well as fixed parameters, a XOR-based operations engine 512 and 532, and a checksum function 513 and 533 engine that may or may not be identical to the one used in KDF 400 engine in FIG. 4. The FPE engine takes as inputs: an input digital key, noted Input Key* in FIG. 5A 510 and noted Input Signature in FIG. 5C 530, input plain text data referred as D in FIG. 5A and FIG. 5C, an input permutation table and an input token referring to the optional user inputs into the system of FIG. 1 via the communication interface 120. The output of FPE 510 and 530 is the result obtained from the last result of the shuffle and toggle function after a controlled loop of successive operation of shuffle and toggle, XOR-based operations and Checksum Function.

The FPD 520 and 540 engines follow the same process as its encryption counterpart FPE 510 and 530, with a permutation in the execution sequence of the identical checksum function 523 and 543 and identical XOR-based operations 522 and 542. In doing so, the input encrypted data, noted C in FIG. 5B 520 and FIG. 5D 540, can be decrypted into the corresponding output plain text Data given that the input Key*, Input Permutation table and input token remain the same for both FPE and FPD process.

FIG. 5A 510 and FIG. 5B 530 corresponds to the FPE-FPD functions process during the signature index X enrollment 600 or during the signature index X recovery and load 700, while FIG. 5C 520 and FIG. 5D 540 correspond to the FPE-FPD function used with the recovered signature index X for host devices 110 data operations, referred as FPE (2) 2200 and FPD (2) 2300 in FIG. 2A, FIG. 2B.

The FPE-FPD (2) 2200 and 2300 engines used for host devices 110 cryptography services may use different input permutation table and input token than, whether fixed or given by the host device, the ones used by FPE-FPD (1) 2082 and 2083 engines during signature index X enrollment 600 and signature index X recovery and load 700. The number of duplicated different FPE-FPD engines with different parameters in the presented disclosure is moreover not limited to two and more FPE-FPD engines may take place for particular applications and purposes.

Figure 6:
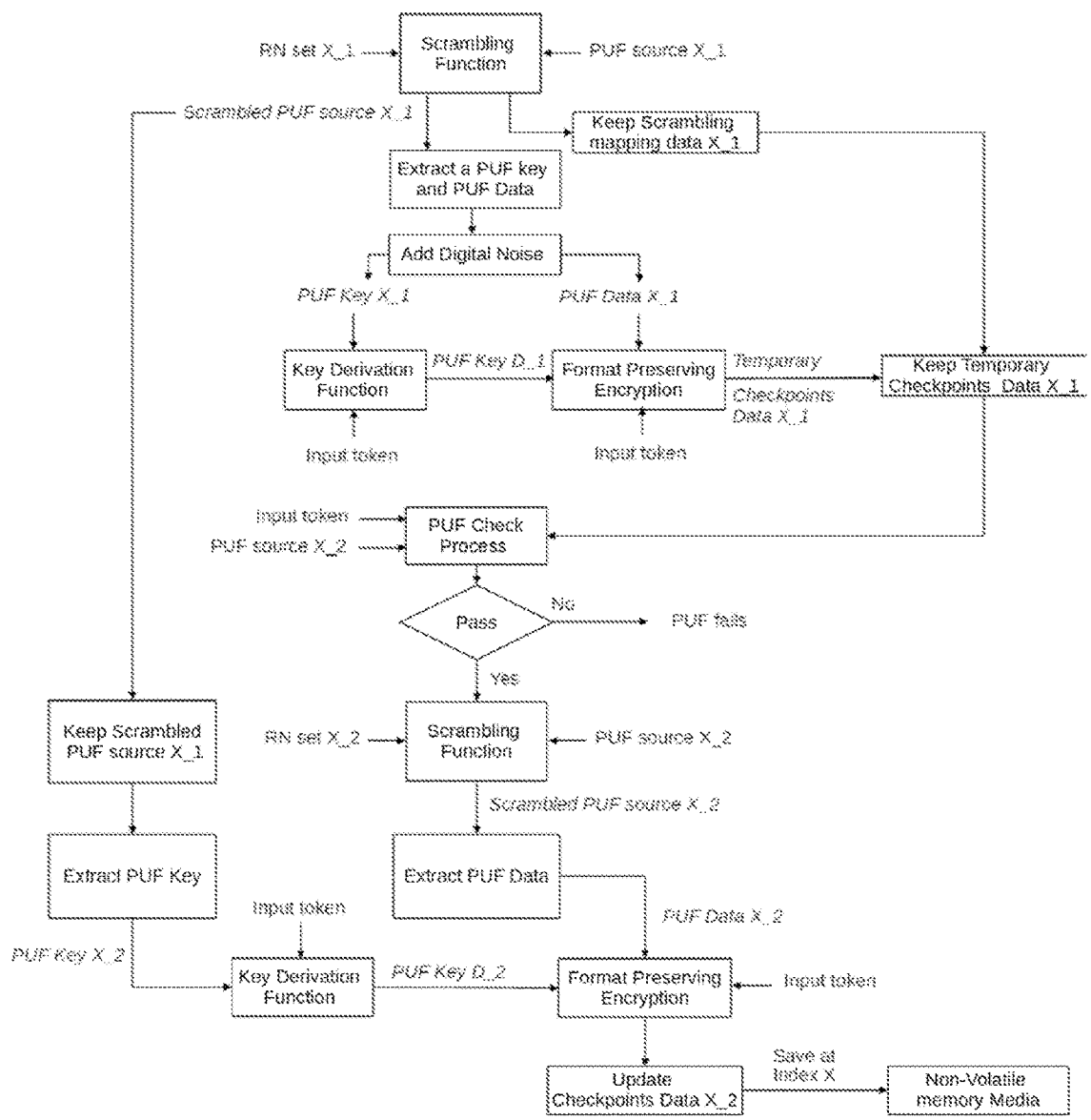
FIG. 6 describes the method and flow to implement the circuitry to perform a signature index X enrollment using the source of PUF entropy dynamically measurable described in FIG. 3 and the KDF and FPE methods described in FIG. 4 and FIG. 5A and FIG. 5B.
Figure 7:
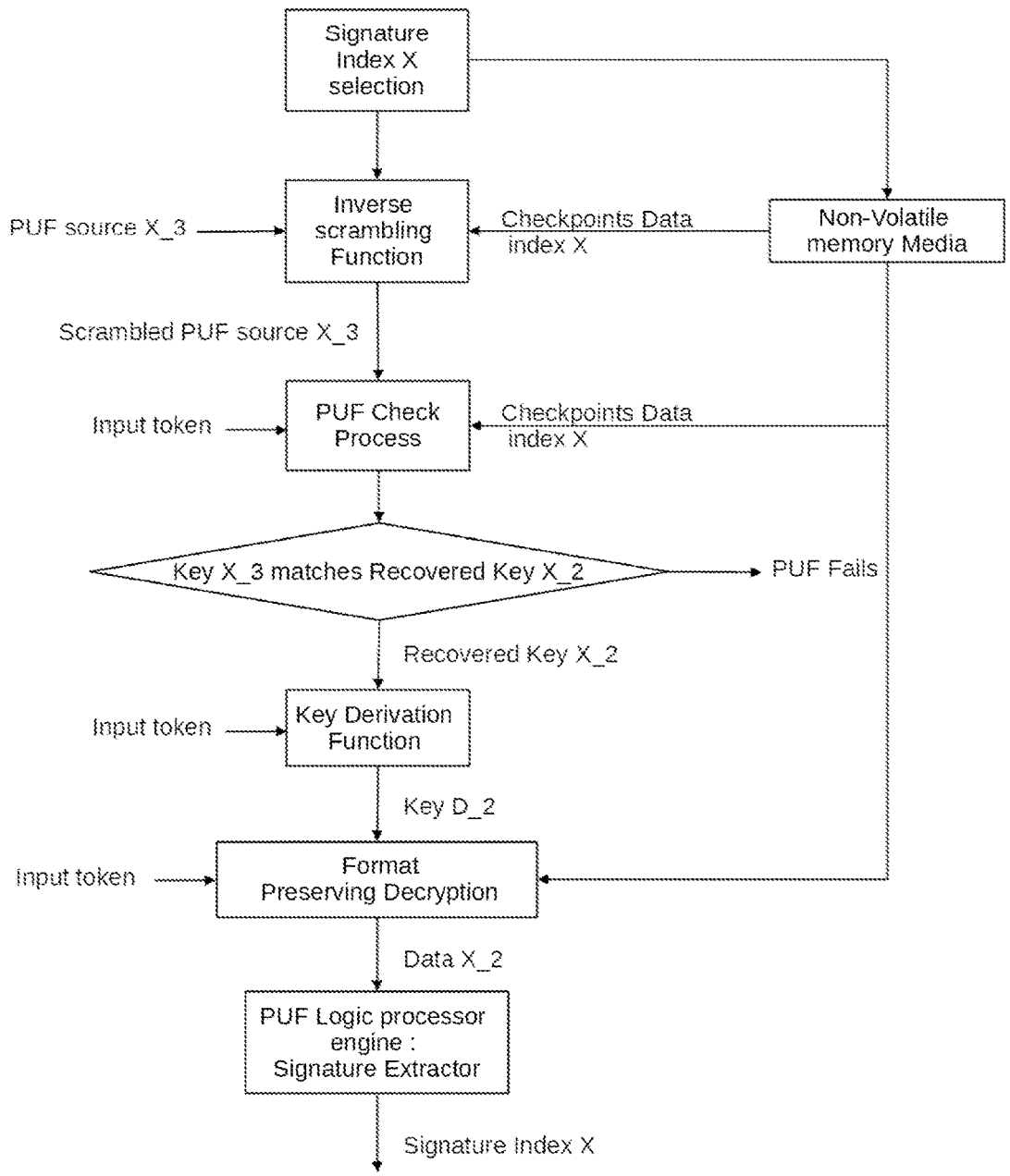
FIG. 7 describes the method and flow to implement the circuitry used to perform the targeted signature index X recovery and load to activate and buffer the requested signature index X, using the sub-circuits mentioned in FIG. 2A and FIG. 2B, that will be further used by the systems described in FIG. 5C and FIG. 5D for functional PUF-based credentials provisioning interface with the host or connected device.
Figure 8:
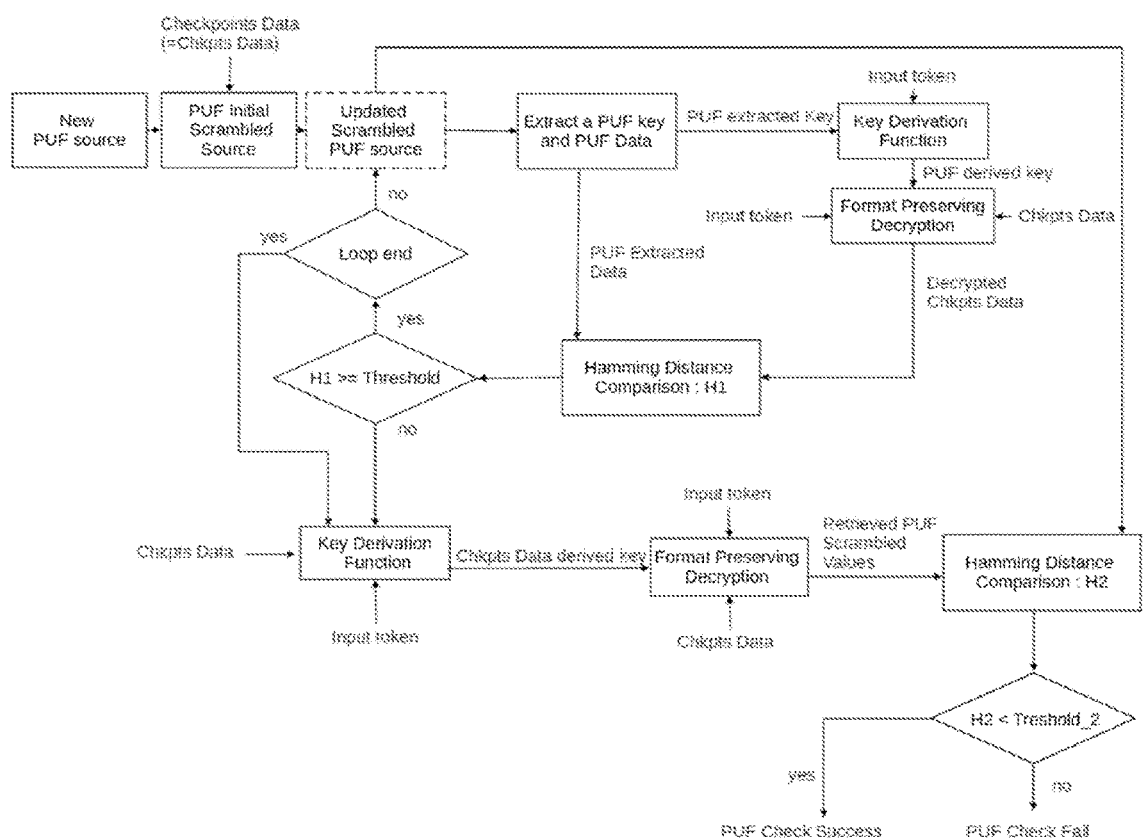
FIG. 8 describes the PUF Check process executed by the PUF check engine of FIG. 2A and FIG. 2B, method and flow to implement the circuitry used to check the validity the PUF system using sub-circuits described in FIG. 4, FIG. 5A and FIG. 5B, along with internal logical operation and non-volatile memory mentioned in FIG. 2A and FIG. 2A.

In the described embodiments in FIG. 6, FIG. 7 and FIG. 8, the FPE-FPD engines in used correspond to the FPE (1) 2082 and FPD (1) 2083 in FIG. 2A and FIG. 2B. The FPE (2) and FPE (2) in FIG. 2 may be duplicated with an FPE-FPD (3) and so on but do not take part in the processes of signature index X enrollment 600 or recovery and load 700.

Adding FPE (2) 2200 and FPD (2) 2300 and eventual more into the disclosed system, guarantee that all the output sequences of the disclosed system behave like there were a series of true random numbers sequences, protecting the true hardware identities of the system with another level of encryption before being used for standard security and cryptographic mechanisms such as device authentication, symmetrical or asymmetrical encryption.

Shuffle and toggle functions 2070, digital logic circuitry in PUF logic processor engine 2090, KDF 2081 and FPE-FPD 2082-2083 engines are used in the process of signature index X enrollment 600 or recovery and load 700 along with the quasi-static digital device print by 330, source of PUF entropy measurable 310, and random number sets, RN X by 320.

In the further description of embodiments, the system blocks referring to operations other than KDF and FPE are included in the sub-systems PUF logic processor engine 2090, PUF check engine 2100 and shuffle and toggle function engine 2070 in FIG. 2A and FIG. 2B

The process and method of creating a new signature index X is described in FIG. 6 and referred as signature index X enrollment 600. Each new index X is entangled with a random numbers set X, RN set X, later kept and used to form randomized checkpoints data for index X 135 safely stored in a non-volatile memory 2050 media that may or may not be physically included within the circuit.

The signature index X enrollment 600, or creation of signature index X, upon the request from the host device 110 to create or regenerate a specific given digital signature index X, takes first as input: a PUF source X_1 and an RN set X_1. The X corresponding to the final signature index and the number after X to the number of functional iteration during the process.

From the first measured quasi-static PUF source X_1 and first RN set X_1, a scrambling function is performed from which a first digital sequence is extracted as PUF key X_1 and a second digital sequence extracted as PUF Data X_1 through a binary logic extractor with a function to add digital noise. The original PUF source X_1 has been scrambled and the scrambling mapping data X_1 need to be kept to be re-used later in the process, as well as the now scrambled PUF source X_1.

The randomized PUF Key X_1 is processed through the KDF engine 400 described in FIG. 4, as the input Key#, with a specified or default input token. The output results of the KDF engine 400 is noted PUF Key D_1 and also includes a defined bit permutation table, corresponding to the output permutation table in FIG. 4. The randomized PUF Data X_1 are then processed through the FPE engine 510 described in FIG. 5A for encryption entangled to the identical input token as the previous KDF engine 400 operation and PUF Key D_1.

This first FPE 510 process generates a first set of checkpoints data X_1 that will be kept along temporarily with the scrambling mapping data X_1 indexes used to randomize to original PUF source X_1.

A second PUF source X_2 is then requested from the source of PUF entropy dynamically measurable 310 via the quasi-static voting mechanism 330 and used to attempt a PUF check process 800 as a PUF well-functioning behavior verification process described in FIG. 8. Given the same input token as precedent operations, the circuit will attempt to converge toward the same checkpoints data X_1 output using a different PUF source input by 330, called PUF source X_2 and the same scrambling mapping data X_1 as for the PUF source X_1.

Upon success of the PUF check process 800, a new RN set X_2 by 320 may be requested and a new scrambling function is performed, although the first RN set X_1 scrambling mapping data may be re-used. Each PUF source X by 330 being different, the same scrambling parameters will give different scrambled PUF source X result.

From the scrambled PUF source X_2, PUF Data X_2 sequence are extracted the same way PUF Data X_1 were extracted. From the scrambled PUF source X_1, the PUF Key X_2 is extracted without adding random noises and a PUF Key D_2 is generated by the KDF 400 engine using the same digital input token as previously used.

The PUF Data X_2, PUF Key D_2 and the input token are used as input of FPE 510 engine, as in FIG. 5A, to generate the update checkpoints data X_2, the final checkpoints data index X 135 attached to the signature index X and entangled with the volatile input token from the user, typically a password, a fingerprint, a hash sequence etc. or the default input token.

The process and method of signature of index X recovery and load 700, previously created with 600 according to the embodiment described in FIG. 6 is described in FIG. 7. The host or connected electronic device 110 selects the desired signature index X to recover and load through the communication interface 120. During the process of signature of index X recovery and load 700, each index X corresponds to a set of saved checkpoints data index X 135 organized in the non-volatile memory 2050 media that can be embedded within the silicon device area of the multiple digital signature security zone 2000 or connected externally. Once the index X is selected and a matching input token with the one used for signature index X enrollment 600 process of the targeted signature index X is given by the host or connected electronic device 110, the process of signature index X recovering and load 700 can start. If no input token had been used during the signature index X enrollment mechanism 600, the default digital input token used to create the signature index X is re-used for loading the signature index X. The signature index X recovery and load 700 starts with the collection of a PUF source X_3 by 330. This PUF source X_3 is different, with a range of acceptable statistical changes, from the PUF source X_1 and X_2 used to enroll and create the signature index X.

Using the checkpoints data index X 135, the PUF source X_3 is inverse-scrambled according to the scrambling mapping data X used for PUF source X_2 during the signature index X enrollment 600 mechanism via an inverse scrambling function doing the opposite process as the scrambling function in FIG. 6. The PUF check process 800 is then performed, further described in the embodiment in FIG. 8. The validity of the PUF source X_3 combined with checkpoints data index X 135 is assessed by this PUF check process 800 that uses: the identical digital input token used for signature index X enrollment mechanism 600, the checkpoints data index X 135 and a new dynamically measured PUF source X_3. The goal of this PUF check process 800 is to be able to recover a digital sequence Key X_3 from the new PUF source X_3 that matches with the recovered Key X_2 based on the new PUF source X_3 and the check-points data X. Upon success, the recovered Key X_2 is kept and derivate through the KDF 400 engine also using the same matching digital input token. The Key D_2 corresponding to the one obtained during the signature enrollment stage is recovered and decrypted to obtain through the FPD 2083 engine the original Data X_2 obtained during the signature index X enrollment 600, from which a combinatorial logic extractor within the PUF logic processor 2090 engine computes the final digital sequence Signature Index X.

The digital sequence signature index X can therefore be used for any encryption and decryption mechanism such as FPE (2) 2200, FPD (2) 2300, AES256, a combination of symmetrical encryption mechanisms, hashing mechanism or authentication mechanism being singularly related to: the unique PUF source quasi-static behavior of the dis-closed invention by 330, particular random numbers by 320, digital input via 120 token and checkpoints data 135.

Once the signature index X is recovered and loaded, it may be used through the FPE (2)-FPD (2) 2200-2300 engines for various applications, such as data encryption, encrypted security keys storage or unique security keys generations along with the ability to create random numbers separately using the dynamically measurable features of the source of PUF entropy 300.

An unlimited set of signatures index X can be enrolled and created, updated and recovered at any time. Each signature depends on the static entropy of each PUF source by 330, true random numbers by 320 and if desired additional digital input token that can take the forms of a password, a network address or a fingerprint but not limited to via 120.

The specific embodiment of the PUF check process 800 is described in FIG. 8. The PUF check process 800, whether for a new signature index X enrollment 600 or signature index X recovery and load 700, is a process in charge to judge the correlation between a set of saved checkpoints data input and a new PUF source input given the same input token used in the current process and the one used to create the mentioned checkpoints data. The new PUF source input is in both cases, signature index X enrollment 600 or signature index X recovery and load 700, using a scrambling function to be transformed into a scrambled version of PUF source by 330. The PUF source scrambled data are updated cyclically, referred as updated scrambled PUF source, using the PUF Key and Data extractors, KDF 400 and FPD 520 engines in a loop until a defined threshold hamming distance is reached between new PUF extracted data and decrypted PUF extracted Data from the loaded checkpoints data 135. The loop is repeated until a hamming distance lower than the threshold fixed H1 is reached or until the maximum allowed loop operation is reached.

The second part of the PUF checking process 800 aims at successfully recover the scrambled PUF source from the checkpoints data 135 and input token and compare it with the last updated scrambled PUF source from the first part of the process. The evaluation of fail or success depends on the hamming distance, H2, obtained between the two final scrambled sources, one updated from a new PUF source process management, referred as updated scrambled PUF source, and one recovered from more parts of the checkpoints data and the new PUF source, referred as retrieved PUF scrambled values.

The PUF checking process 800 guarantees that if the device is tampered, or some inputs are wrong, the system will not recover any digital signatures at all and avoid any possible false positive results, by checking the correct entanglement of all dependencies: algorithmic parameters, input token, PUF source measurements and check-points data; sets of dependencies different for all different index X.

In another embodiment, an format preserving encryption and decryption device comprising: a set of shuffle and toggle functions taking an input key, or input signature, and an input plaintext data, or input encrypted data, to performs changes on input plaintext data or input encrypted data according to the input key or input signature; a XOR-based operations engines using a bitwise input permutation table to permute the output of the shuffle and toggle function block; a checksum function that will create a hash value of the output of its previous function output; a controlled loop with defined number of iteration that will determine when the final output of the format preserving encryption or decryption algorithm is ready taking the last shuffle and toggle function result as final output.

In still another embodiment, the digital input signature is used as symmetrical encryption key and where the host device through the communication provides the data to encrypt or decrypt and receives the related result.

In still another embodiment, the digital input key is used as symmetrical encryption key and where the host device provides the data to encrypt or decrypt and save the result in non-volatile memory media.

In still another embodiment, the format preserving encryption engine performs data input encryption and may use additional encryption mechanisms.

In still another embodiment, the digital signature is used as symmetrical encryption key and where the host device through the communication requests the data encryption or decryption from input loaded from the non-volatile memory media.

In still another embodiment, the system can be either implemented on the silicon-based hardware of the device or by firmware software implementation.

The disclosed present invention provides number of advantages, such as:
1) Multiple Unique Digital Signature for a single device and a single PUF source circuit
2) Flexibility in creating, updating and loading digital identities and device's unique digital sequences.
3) Manufacturing process independent
4) Devices lifecycle independent, mostly power-up cycle independent and operating clock frequency independent
5) Enables multiple level of security, authentication and authorization from within the device with the ability to reset and renewed itself upon cybersecurity threat detected Various modifications to these embodiments are apparent to those skilled in the art from the description and the accompanying drawings. The principles associated with the various embodiments described herein may be applied to other embodiments. Therefore, the description is not intended to be limited to the embodiments shown along with the accompanying drawings but is to be providing broadest scope consistent with the principles and the novel and inventive features disclosed or suggested herein. Accordingly, the application is anticipated to hold on to all other such alternatives, modifications, and variations that fall within the scope of the present application and the appended claims.

What is claimed is:

1. A Multiple digital signature Security Zone system comprising:
an electronic circuit to create a source of PUF entropy dynamically measurable that can be measured anytime during the device operation upon a trigger signal, and which result is used to generate a quasi-static digital device print and true random numbers;
a random numbers generator circuitry using measured results from the source of PUF entropy dynamically measurable;
a quasi-static states voting mechanism creating a quasi-static digital device print pattern using the measured results from the source of PUF entropy dynamically measurable;
a set of digital bitwise shuffle and toggle functions to randomize and shuffle a quasi-static digital device print;
a key derivation function engine taking random numbers, static and quasi-static digital sequences as inputs and generating an entangled digital output;
a set of format preserving encryption and decryption engines which may be duplicated at will in the circuit including both encryption and decryption mechanisms, and providing the ability to create or enroll and recover and load multiple unique PUF-based digital sequences used as unique digital signatures;
a non-volatile memory media to store certain checkpoints data but not limited to, which may be integrated within the device silicon area but not necessarily;
a communication interface adapted to the system target host device to manage inputs and outputs of the disclosed system;
a system controller to execute commands and provide the multiple digital signature security zone system results from the target host device or connected device;
wherein the format preserving encryption and decryption engines take a digital key and a digital input data, encrypted data or plaintext data, sequence as inputs to output an encrypted or plaintext data, and is a symmetrical encryption mechanism.

2. The system of claim 1, wherein the source of PUF entropy dynamically measurable is an array of PUF cell units that can be measured after electrical challenge at any given time, independently from power cycle, system clock frequencies and manufacturing process.

3. The system of claim 1, wherein the random numbers generator circuit is a true random numbers generator using repeated measurements of source of PUF entropy dynamically measurable binary states results to generate directly a true random number without assistance of further pseudo-random generation algorithms.

4. The system of claim 1, wherein the quasi-static states voting mechanism is a statistic counting circuit using the repeated measurements of source of PUF entropy binary states measured results to generate a quasi-static digital device print which may or may not be different for each measurement iteration cycle.

5. The system of claim 1, wherein the shuffle and toggle functions uses internally-created true random numbers from the source of PUF entropy dynamically measurable and may be implemented as shared resource block for any functions, wherein the functions may use defined static parameters that can be changed without affecting the correct functioning.

6. The system of claim 5, wherein the shuffle and toggle functions can be either a hardware circuitry or a software implementation.

7. The system of claim 6, wherein the design of the system can be either a hardware silicon circuitry or a software implementation.

8. The system of claim 1, wherein the key derivation function is a circuit composed of a defined controlled loop of checksum functions and hash functions with defined internal static parameters.

9. The system of claim 1, wherein the non-volatile memory media can be internally or externally integrated to the system.

10. The system of claim 1, wherein the communication interface is integrated with the central system controller according to the host target device, independently from an external interface.

11. The system of claim 1, wherein the random number generator is configured to be requested at any time of the device cycle.

12. The system of claim 1, wherein the digital signature recovered is configured to be stored within the device volatile memory for a system-defined or user-defined time or cycles.

13. The system of claim 1, wherein the communication interface and central system controller may be a processor unit.

14. The system of claim 1, wherein the management of the creation and recovery of digital signatures depend on host device commands or pre-defined commands operations without affecting any other device and host device operations cycles, powering up and functions.

15. The system of claim 1, wherein the device outputs seen by the host device is only either the output of the true random number generator unit or the output for the format preserving encryption and decryption.

16. A digital signature index enrollment system comprising:
- a true random numbers generator used to randomize each enrollment and iteration process in order to create a different digital signature for each iteration independently from other fixed digital inputs;
- a source of PUF entropy dynamically measurable used to measure a unique system digital behavior, digital device print, after any given requests during device operation;
- a logic circuitry comprising a set of sequentially arranged key derivation functions, scrambling functions, shuffle functions, toggle functions, checksums functions and format preserving encryption and decryption functions to generate a ciphered unique digital signature and checkpoints data to recover the ciphered unique digital signature without performing error-correcting codes algorithms but using multiple curves cryptography engine based on fixed inputs, source of PUF entropy and checkpoints data to converge toward a unique digital signature;
- a non-volatile storage media to save each different digital signatures mathematical checkpoints data used to recover and load a target indexed digital signature.

17. The system of claim 16, wherein the true random numbers generator is logic bitwise operations based using the output of the source of PUF entropy dynamically measurable results as input.

18. The system of claim 16, wherein the logic circuitry made to do a digital signature enrollment uses the true random numbers generator, source of PUF entropy dynamically measurable results that may be as multiple as desired and an optional digital host device input.

19. The system of claim 16, wherein the non-volatile storage media stores the specific mathematical checkpoints data attached to a unique set of random numbers, a unique set of source of PUF entropy and unique optional digital inputs that may be fixed internally to the system when not specified.

20. The system of claim 16, wherein the digital checkpoints data are stored in non-volatile memory media and is used to recover and load one unique and indexed digital signature; and where the non-volatile memory media may store one or several versions of checkpoints data to generate several unique digital signatures enabling the multiplicity of digital signatures.

21. The system of claim 16, further comprising: a communication interface, configured for communication with a host or connected device via standard communication protocols, wherein the checkpoints data saved in non-volatile memory media are saved and indexed according to a specific index given by the host or connected device through the communication interface.

22. The system of claim 16, wherein the checkpoints data are singularly attached to the intrinsic system of the device as well as defined digital inputs, are a series of random numbers that do not present any relevant clues regarding the values of each digital signatures or used digital inputs.

23. The system of claim 16, wherein the system is configured to store several versions of the unique digital signature.

24. The system of claim 16, wherein the system is implemented by silicon-based hardware or firmware software implementation.

25. A PUF digital signature recovery apparatus comprising:
- a source of PUF entropy dynamically measurable;
- a logic circuitry comprising a set of sequentially arranged key derivation functions, toggling functions, checksums functions and format preserving encryption end decryption functions to retrieve a ciphered unique digital signature using data checkpoints and multiple curves cryptographic functions based on fixed inputs, entropy source and the checkpoints data to converge toward the ciphered unique signature, similar system functions block;
- a non-volatile storage medium to read digital signatures mathematical check points.

26. The apparatus of claim 25, wherein the source of PUF entropy dynamically measurable provides a unique measured result each time requested.

27. The apparatus of claim 25, wherein the logic circuitry performs the digital signature recovery and load based on target indexed checkpoints data from the non-volatile memory storage media, new PUF source results measurements and optional host or connected device digital input that may also be fixed as a parameter or as a default value.

28. The apparatus of claim 25, wherein the non-volatile memory check point data are targeted by the host device through the communication interface system and constitute the selected digital signature index to recover and load.

29. The apparatus of claim 25, wherein the system recovers a unique digital signature according to the host device digital inputs.

30. The apparatus of claim 25, wherein the apparatus is configured to store several versions of the unique digital signature.

31. The apparatus of claim 25, wherein the apparatus is implemented by silicon-based hardware or firmware software implementation.

32. A dynamic and re-usable PUF-based multiple unique digital hardware signatures creation and recovery system comprising:
- source of PUF entropy dynamically measurable at any time during the device operation that is used to create or enroll and recover every different indexed hardware-based digital signatures;
- a true random numbers generator engine, source of PUF entropy dynamically measurable data;
- a permanent and dynamic digital access engine to different indexed set of external or internally saved data, each set of data is related to one particular hardware signature index, generated during signature enrollment mechanism and used for signature recovery and loading mechanism;
- a hardware digital signatures enrollment mechanism, in charge of creating an indexed hardware digital signature's checkpoints data based on fixed and dynamic parameters;
- a hardware digital signatures recovery mechanism, in charge of recovering an indexed hardware-based digital signature using the indexed checkpoints data and re-using the same fixed and/or dynamic parameters used for the digital signatures enrollment process.

33. The system of claim 32, wherein the source of PUF entropy dynamically measurable can only be implemented in hardware design while the other elements can be either implemented by software or hardware.

34. The system of claim 32, wherein the permanent and dynamic digital access engine to internally or externally saved checkpoints data is a logic design of a real-time read and write protocol that may be called or used at any given time of the device operation cycles.

35. The system of claim 32, wherein the enrollment engine of the hardware digital signature creates unique checkpoints data to ensure the success of the recovery and load engine and is based on the use of a set of cryptography functions.

36. The system of claim 32, wherein the recovery engine of the hardware signature read the unique checkpoints data for the target hardware signature and recover this unique digital signature using the same set of, or at least one, cryptography functions.

37. The system of claim 32, wherein a different hardware digital signature can be created, updated or retrieved upon the system input command at any time during the system operation.

* * * * *